United States Patent Office 3,660,282
Patented May 2, 1972

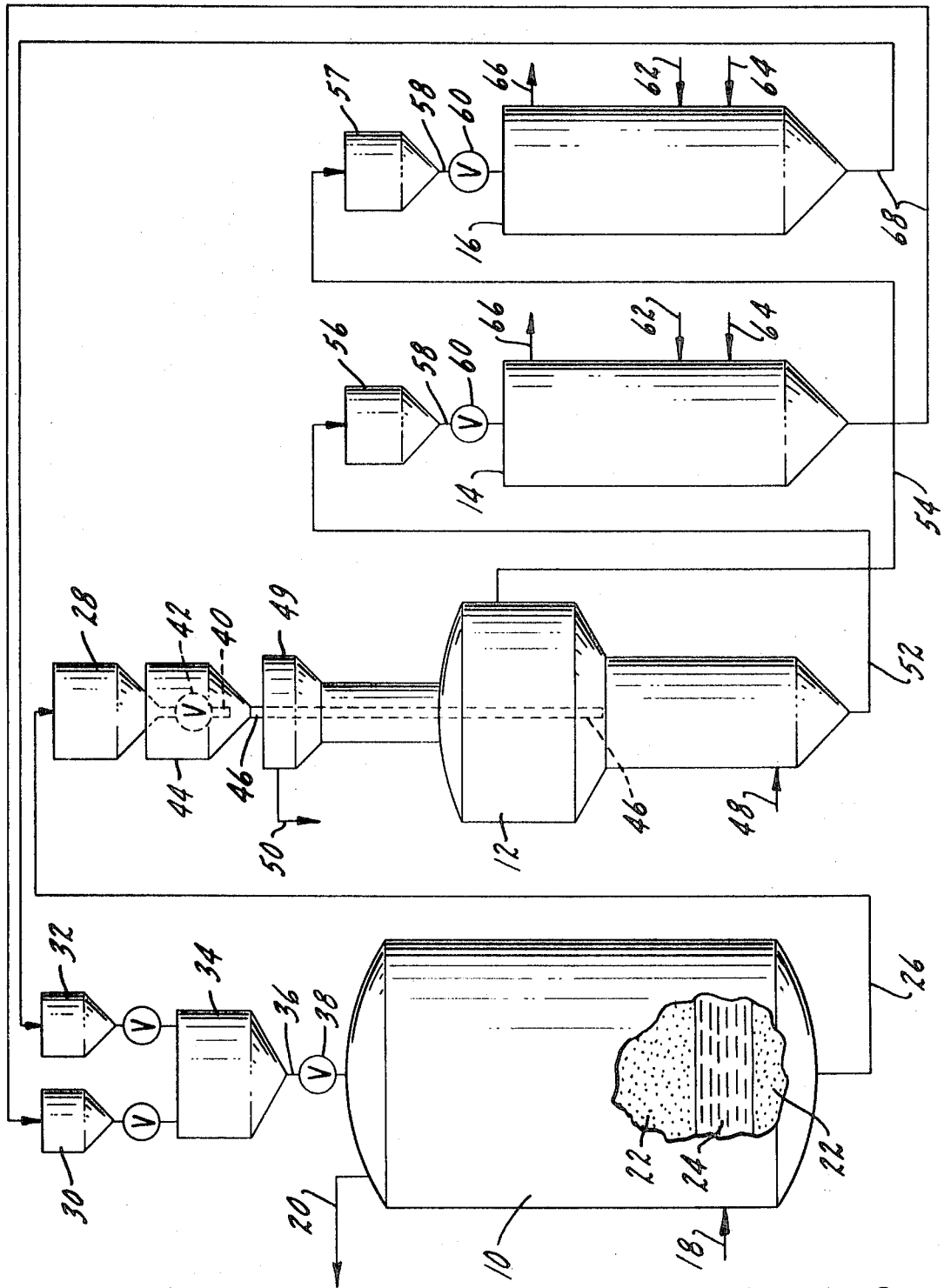

3,660,282
METHOD AND APPARATUS FOR REGENERATING MIXED BEDS OF ION EXCHANGE RESINS
Dennis M. O'Brien, Chatham, N.J., assignor to Ecodyne Corporation, Chicago, Ill.
Filed June 17, 1969, Ser. No. 834,070
Int. Cl. B01d *15/06;* B01j *1/06*
U.S. Cl. 210—33                                                                 3 Claims

ABSTRACT OF THE DISCLOSURE

The invention provides an improved method and apparatus for delivering a mixture of anion and cation exchange resins to a separation column. In carrying out the method, resin is delivered rapidly from a metering zone to the transfer zone, and then is delivered from the transfer zone to the separation column at a relatively slow rate of speed. This two-step transfer minimizes undesirable disturbances in the separation column. In the apparatus, the metering and transfer zones are preferably defined by suitable hoppers located above the separation column.

---

The present invention relates to an improved method and apparatus for delivering a mixture of ion exchange resins to a separation zone.

Ion exchange resin methods and systems employing a mixed bed of anion and cation exchange resins are becoming an increasingly important tool for the purification of water. Such systems conventionally employ a service zone, a separation zone, and a pair of regeneration zones.

In the conventional treatment of water by ion exchange in a mixed anion and cation exchange resin bed, the sequence of steps is as follows. Resin that becomes exhausted in the service zone, wherein raw water is treated, is periodically transferred under pressure to a first metering zone. The transfer of resin halts when the first metering zone is filled. Periodically, resin is transferred from the first metering zone to a separation zone, where the anion and cation exchange resins are separated according to their densities. That is, since the exhausted cation resin is denser than the exhausted anion resin, an upflow of water in the separation zone causes the anion resin to rise to the top, while the cation resin sinks to the bottom. The cation resin from the separation zone is conducted to a second metering zone, while the anion resin is conducted to a third metering zone. Periodically, the cation resin is conducted from the second metering zone to a cation resin regeneration zone, while the anion resin is periodically conducted from the third metering zone to an anion resin regeneration zone. The anion and cation resins are regenerated in the regeneration zones, and the regenerated resins are then returned to the service zone.

The service zone, separation zone, and regeneration zones previously referred to are conventionally defined by tanks which are normally referred to in the art as "columns." This terminology will be used herein. A conventional system incorporates a service column, a separation column, a cation resin regeneration column, and an anion resin regeneration column. The resins after regeneration are usually in the hydrogen form (cationic) and the hydroxide form (anionic), although other forms may of course be employed. Similarly, the metering zones are conventionally defined by "hoppers" located above the columns.

Proper separation of the resins depends upon maintaining a smooth upflow of water at the proper rate of speed in order to achieve as complete a separation as possible between the cationic and anionic resins. Therefore, it is not desirable to rapidly feed resin from the first metering zone or hopper into the separation column, as this upsets the delicate balance, stirring up the resin, and causing an undesirable mixing of the resins within the column. On the other hand, it is desirable to empty the first metering hopper rapidly, since the time interval during which the service column is depressurized (when resin transfer cannot occur) is held at a minimum. The reason this interval is short is that the service zone is shut down and depressurized between transfer periods so that regenerated resin may be introduced. Since the service column is not on stream at this time, it is obviously important to keep the interval as short as possible.

Generally, the present invention relates to an improved method for delivering a mixture of ion exchange resins to a separation zone while minimizing disturbances therein, together with improved apparatus for separating ion exchange resins according to their densities. In carrying out the method, a mixture of ion exchange resins of differing densities is delivered from the service zone to a first metering zone. Periodically, the resin is rapidly delivered from the first metering zone to a transfer zone, rather than being delivered directly to the separation zone. The resin in the transfer zone is then delivered to the separation zone at a relatively slow rate of speed.

In its basic form, the apparatus comprises a separation column of conventional design having means for delivering water in an upflow direction through the separation column together with means for removing resin from an upper portion and from a lower portion. In accordance with the invention, the separation column is provided with a transfer hopper positioned above the separation column together with resin input means for delivering resin particles from the transfer hopper to the interior of the tank. A first metering hopper is positioned above the transfer hopper, and resin transfer means are provided for delivering resin particles from the first metering hopper to the transfer hopper. The resin transfer means have valve means to permit the flow of resin from the first metering hopper to be interrupted.

The invention, its organization and method of operation, together with the preferred embodiments thereof, will be best understood by a reference to the following detailed description, taken together with the drawing, which is a diagrammatic illustration of a mixed-bed ion exchange system embodying the features of the present invention.

Referring to the drawing, the ion exchange system illustrated is a basic mixed-bed system having a service column 10, a separation column 12, a cation resin regeneration column 14, and an anion resin regeneration column 16.

The service column 10 has a raw inlet 18 at a lower portion thereof and a treated water outlet 20 communicating with an upper portion. Thus, water under pressure is passed through the service column 10 in an upflow direction through ion exchange resin beads 22 contained within the service column 10. As shown in the drawing, the inflow of water through the raw water inlet 18 produces a separation or gap 24 in the ion exchange resin 22. The raw water passes through the ion exchange resin beads 22 above the gap 24, the resin beads 22 below the gap 24 being forced by pressure outwardly through an exhausted resin transfer line 26 to a first metering hopper 28 located above the separation column 12. Transfer of resin through the exhausted resin transfer line 26 ceases to occur when the first metering hopper 28 is filled. This is the reason that the first hopper 28 is termed a "metering" hopper, since its size determines the volume of exhausted resin that will be transferred.

Fresh resin which has been regenerated in the regeneration columns 14, 16 is retained above the service column 10 in a cation resin storage hopper 30 and an anion resin storage hopper 32. A mixing hopper 34 is positioned below the storage hoppers 30, 32, and above the service column 10. Regenerated resin in the storage hoppers 30, 32 is periodically transferred to the mixing hopper 34, where the anion and cation forms are mixed. A resin inlet line 36 having a valve 38 provides communication between the mixing hopper 34 and an upper portion of the service column 10. When it is desired to supply fresh resin to the service column 10, the raw water inlet 18 is closed, and the column 10 is depressurized. The valve 38 on the resin inlet line 36 is opened, permitting fresh resin to flow downwardly into the service column 10.

At the same time, the first metering hopper 28 above the separation column 12 is emptied. Because the service column 10 has been depressurized, resin cannot move to the first metering hopper 28 through the exhausted resin transfer line 26 at this time.

It is necessary that the first metering hopper 28 be completely emptied during the time interval that the service column 10 is depressurized. This is necessary, since, as previously mentioned, the volume of the first metering hopper 28 will determine the amount of exhausted resin transferred the next time the service column 10 is repressurized. However, because the service column 10 is not operational during the time that it is depressurized, it is desired to empty the first metering hopper 28 as rapidly as possible, so that the service column 10 may be placed back on stream. Generally, the delivery of fresh resin to the service column 10 should take place in less than about two minutes, and preferably should take one minute or less. Such rapid emptying of the first metering hopper 28 directly into the separation column 12 produces an undesirable mixing of the resin, so that the likelihood of contamination of the separated resins is increased. Therefore, in accordance with the present invention, the first metering hopper 28 does not deliver resin directly to the separation column 12.

As shown in the drawing, the first metering hopper 28 has a lower resin transfer line 40 having a valve 42. The lower resin transfer line 40 provides communication between the first metering hopper 28 and a resin transfer hopper 44 which is positioned below the first metering hopper 28. The resin transfer hopper 44, in turn, communicates with the interior of the separation column 12 by means of a resin input pipe 46. In the preferred embodiment, the resin input pipe 46 terminates within the separation column 12 at approximately the point of normal separation between the anion and cation resins. Thus, when the first metering hopper 28 is emptied, in accordance with the present invention, the resin is delivered rapidly to the transfer hopper 44, and is, in turn, delivered slowly to the separation column 12. A proper delivery rate into the separation column 12 may be insured by maintaining a suitably small diameter on the resin inlet pipe 46, or by placing a suitable constriction therein.

As previously mentioned, the separation column 12 separates resin beads according to their densities by delivering water through the column in an upflow direction at a controlled rate of speed. Water enters the separation column 12 through a water inlet line 48 communicating with a lower portion thereof, passes upwardly to a separation column bead tank 49, and is withdrawn through a water outlet line 50 communicating with an upper portion thereof. The resin inlet pipe 46 passes downwardly through the separation column bead tank 49. The lower portion of the separation column 12 is preferably of a smaller diameter than the upper portion. This smaller diameter in the lower portion produces a higher flow rate through the more dense cationic resin, and a lower flow rate through the less dense anionic resin, thus enhancing the efficiency of separation.

The separated resins are removed from the separation column 12 through a lower cation resin outlet line 52 and an upper anion resin outlet line 54. The resin outlet lines 52, 54 transfer the resin to second and third metering hoppers 56, 57, respectively, above the cation and anion resin regeneration columns 14, 16 respectively. This transfer takes place because the water outlet line 50 on the separation column head tank 49 is positioned on a level above the second and third metering hoppers 56, 57, respectively.

The second and third metering hoppers 56, 57 communicate with associated regeneration columns 14, 16 through resin transfer lines 58, each having a valve 60. The sizes of the second and third metering hoppers 56, 57, respectively, determines the amount of resin that will be delivered from the separation column 12 to the regeneration columns 14, 16 in each "slug." Resin is regenerated within the regeneration columns 14, 16 by an upwardly flowing stream of regenerant, which enters the columns 14, 16 through a regenerant inlet line 62. Water is introduced into each of the regeneration columns 14, 16 through a water inlet line 64 communicating with the regeneration column 14, 16 below the regenerant inlet line 62. The regenerant and water are removed from the regeneration columns 14, 16 through an exhausted regenerant outlet line 66.

In the case of the cation resin regeneration column 14, the regenerant will usually be an acid such as hydrochloric acid or sulfuric acid, although other cationic regenerants may be employed. Similarly, in the anion resin regeneration column, conventional anion resin regenerants, such as sodium hydroxide solution, are ordinarily employed. Because the regeneration columns 14, 16 are ordinarily maintained under pressure, regenerated resin will be delivered to the cation and anion resin storage hoppers 30, 32, respectively, through resin delivery lines 68 under the influence of pressure. It will thus be seen that the cation and anion resin storage hoppers 30, 32 also function as "metering" hoppers, in that their volume controls the amount of resin that may be transferred from the regeneration columns 14, 16.

Periodically, the regeneration columns 14, 16 are depressurized, and exhausted resin from the hoppers 56, 57 is introduced into them by opening the valves 60 in the resin transfer lines 58. At the same time, the resin in the storage hoppers 30, 32 will be fed into the mixing hopper 34. Then, when the regeneration columns are repressurized, resin will again be transferred through the resin delivery lines 68 until the hoppers 30, 32 have again been filled. In contrast to the considerations which apply to the separation column 12, there is no disadvantage to delivering resin directly from the cation and anion resin storage hoppers 30, 32, respectively, into the mixing hopper 34. In fact, just the opposite is true, since it is desired to have mixing occur in the mixing hopper 34.

As previously discussed, in accordance with the present invention resin is delivered through the resin inlet pipe 46 into the separation column 12 at a relatively slow rate of speed. Of course, this resin delivery should be accomplished over a time period which is no greater than the interval between emptyings of the first metering hopper 28. Preferably, the transfer hopper 44 should empty into the separation column 12 in a time no greater than the shortest interval between emptyings of the second and third metering hoppers 56, 57, respectively, into their respective regeneration columns 14, 16. Generally, these two intervals will be the same. In this manner, a relatively even level of resin in the separation column 12 will be maintained. In most operations, the first metering hopper 28 will empty about every five to seven minutes, while the second and third metering hoppers 56, 57, respectively, above the regeneration columns 14, 16 empty about every three minutes. Thus, in the preferred embodiment, the transfer hopper 44 should empty into the separation column 12 over a time interval of about three to seven minutes.

The method and apparatus of the present invention are adaptable to use with a wide variety of anion and cation resins, so long as they differ in density (when exhausted)

a sufficient amount to permit them to be separated in the separation column 12. Typical solid cation exchange resins which may be employed in the present invention are those of the divinylbenzenestyrene copolymer type, the acrylic type, the sulfonated coal type, and the phenolic type. These may be used in the sodium, hydrogen, ammonium, or hydrazine form, for example, although they are generally used in the hydrogen form. Typical solid anion exchange resins that may be employed in the present invention are the phenol-formaldehyde type, the divinylbenzenestyrene copolymer type, the acrylic type, and the epoxy type. The anion resins may be used in the hydroxide or chloride form, for example. The anion and cation resins are both preferably employed as beads in the size range of about 16–60 mesh. Suitable bead resins are sold under the trade names Amberlite, manufactured and sold by Rohm & Haas Company, and Nalco sold by Nalco Chemical Company. Particularly suitable ion exchange resins are sold under the trade names Amberlite IRA–900 and IRA–910 (anionic); and IRA–200 and IRA–120 (cationic).

Obviously many modifications and variations of the invention as hereinbefore set forth will occur to those skilled in the art, and it is intended to cover in the appended claims all such modifications and variations as fall within the true spirit and scope of the invention.

I claim:

1. In the treatment of water by ion exchange in a mixed bed of anion and cation exchange resins comprising the steps of periodically transferring resin from a pressurized service zone to a first metering zone; periodically transferring resin from said first metering zone to a separation zone; separating said anion and cation exchange resins in said separation zone; conducting said cation resin to a second metering zone; conducting said anion resin to a third metering zone; periodically conducting said cation resin from said second metering zone to a cation resin regeneration zone; periodically conducting said anion resin from said third metering zone to an anion resin regeneration zone; regenerating said resins in said regeneration zones; and periodically depressurizing said service zone and returning said regenerated resins to said service zone while said service zone is depressurized, the improvement comprising: delivering said resin from said first metering zone to a transfer zone over a time interval which is no greater than the time interval during which said service zone is depressurized; and delivering said resin from said transfer zone to said separation zone over a time interval which is no less than the shortest time interval between transfer periods from said second and third metering zones to said regeneration zones.

2. The method as defined in claim 1 wherein said resin is delivered from said transfer zone to said separation zone over a time period of about 3 to 7 minutes.

3. Improved apparatus for the treatment of water by ion exchange in a mixed bed of anion and cation exchange resins comprising: a service column; a separation column; means for delivering water in an upflow direction through said separation column; an anion resin regeneration column; means for delivering resin from an upper portion of said separation column to said anion resin regeneration column; a cation resin regeneration column; means for delivering resin from a lower portion of said separation column to said cation resin regeneration column; means for regenerating said resins in said regeneration columns; means for transferring said resins from said regeneration columns to said service column; a transfer hopper positioned above said separation column; resin input means for delivering resin from said transfer hopper to the interior of said separation column; a metering hopper positioned above said transfer hopper; means for delivering resin from said service column to said metering hopper; resin transfer means for delivering resin from said metering hopper to said transfer hopper; and valve means on said resin transfer means.

References Cited
UNITED STATES PATENTS

| | | | |
|---|---|---|---|
| 2,767,140 | 10/1956 | Fitch | 210—33 |
| 2,973,319 | 2/1961 | Porter | 210—33 |
| 3,193,498 | 7/1965 | Platzer et al. | 210—33 |
| 3,432,429 | 3/1969 | Mihara et al. | 210—33 |

REUBEN FRIEDMAN, Primary Examiner

T. G. WYSE, Assistant Examiner

U.S. Cl. X.R.

210—189